UNITED STATES PATENT OFFICE.

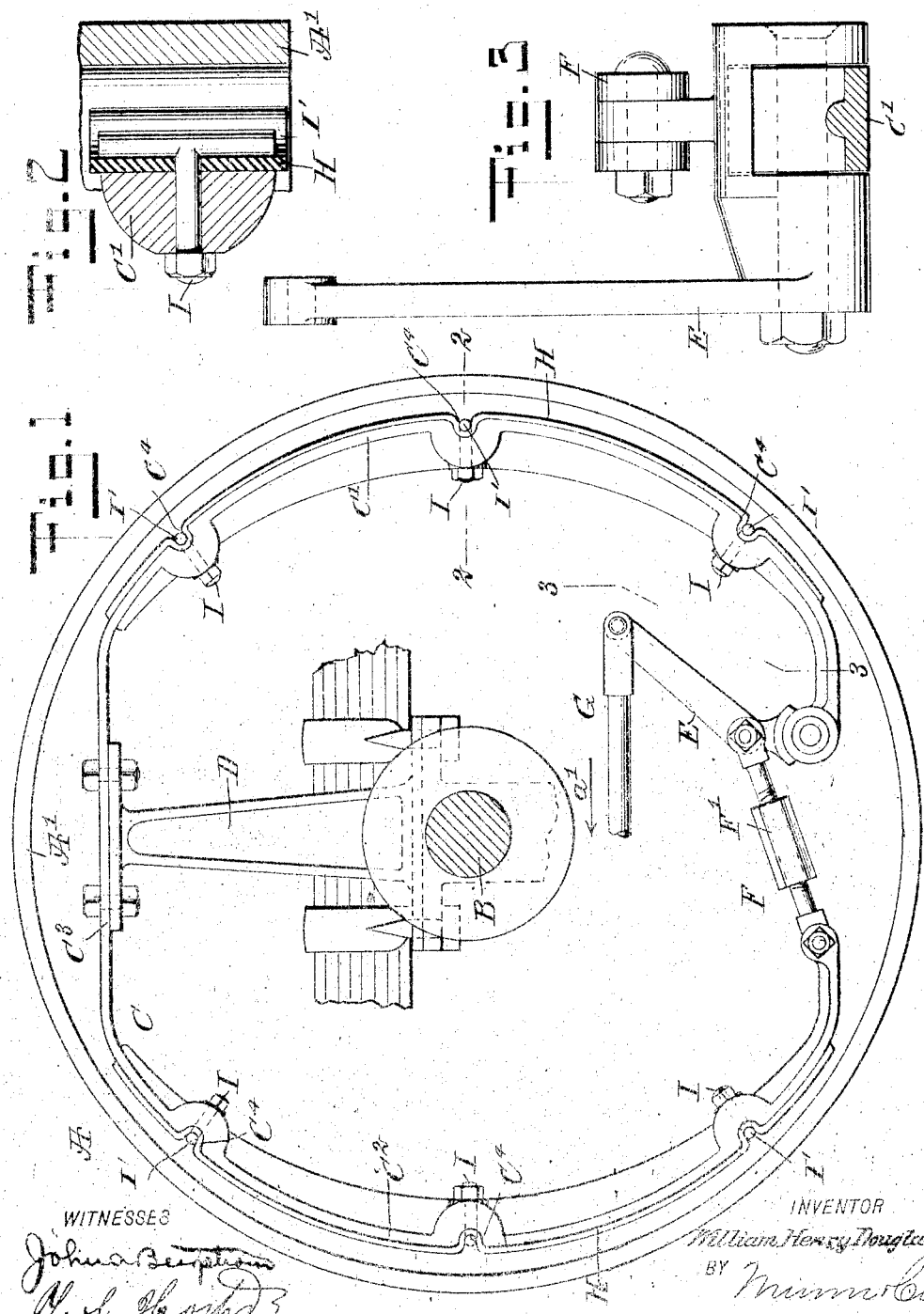

WILLIAM HENRY DOUGLAS, OF BELLEVILLE, NEW JERSEY, ASSIGNOR TO HEALEY & CO., OF NEW YORK, N. Y., A CORPORATION.

BRAKE MECHANISM.

No. 864,625.  Specification of Letters Patent.  Patented Aug. 27, 1907.

Application filed September 26, 1906. Serial No. 336,266.

*To all whom it may concern:*

Be it known that I, WILLIAM HENRY DOUGLAS, a citizen of the United States, and a resident of Belleville, in the county of Essex and State of New Jersey, have invented a new and Improved Brake Mechanism, of which the following is a full, clear, and exact description.

The invention relates to brakes having a brake wheel and a flexible band for engagement with the rim of the brake wheel.

The object of the invention is to provide a new and improved brake mechanism for use on automobiles and other machines and arranged to permit the operator to conveniently and forcefully apply the brake mechanism wherever it is desired to do so, and to instantly release the brake mechanism when required.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is an enlarged sectional plan view of the same on the line 2—2 of Fig. 1, and Fig. 3 is an enlarged transverse section of the same on the line 3—3 of Fig. 1.

The brake wheel or drum A is secured on the shaft or axle B to be braked. The rim $A'$ of the said brake wheel A is adapted to be engaged at its inner face by the side arms or shoes $C'$, $C^2$ of a segmental brake band C made of steel and bolted or otherwise secured at its middle $C^3$ to a bracket or like fixed support D. On the free end of the side arm $C'$ of the brake band C is fulcrumed a lever E connected by a link F with the free end of the other side arm $C^2$, and the said lever E is connected at its free end by a link G with suitable mechanism under the control of the operator, for imparting a swinging motion to the lever E, with a view to apply or release the brake mechanism, as hereinafter more fully described. The link F is preferably made sectional with a turn buckle for adjusting the length of the link $F$, to bring the side arms or shoes $C'$, $C^2$ in proper relation with the rim $A'$ of the brake wheel A. The side arms $C'$, $C^2$ are provided on the outer faces with coverings H made of leather, rubber or other suitable material and fastened by bolts I to the corresponding side arm, as plainly indicated in Figs. 1 and 2, each bolt I having its head $I'$ arranged to engage the outer face of the covering H, to draw the same into a recess $C^4$ formed in the corresponding side arm or shoe $C'$ or $C^2$. Now by the use of three of such clamping bolts I the covering H can be securely fastened to the corresponding side arm or shoe $C'$ or $C^2$ and properly stretched thereon, so that when the side arms $C'$, $C^2$ are moved outward the coverings H move in frictional contact with the inner face of the rim $A'$ to brake the wheel A.

Now when the several parts are in the position illustrated in Fig. 1, the brake wheel or drum A is released and when it is desired to apply the brake mechanism the operator imparts movement to the link G in the direction of the arrow $a'$, so as to swing the lever E and thereby cause the side arms $C'$ and $C^2$ to swing outwardly, thus moving the coverings H in frictional contact with the inner face of the rim $A'$ to brake the wheel or drum A.

Now by the construction described it will be seen that the side arms or shoes $C'$, $C^2$ flex from points adjacent to the bracket or support D, that is, the brake band has inherent fulcrums for its side arms $C'$, $C^2$ to swing on. When the operator moves the link G in the inverse direction of the arrow $a'$ then the side arms $C'$, $C^2$ immediately return to their non-active position by their inherent resiliency thus releasing the brake wheel or drum A.

The brake mechanism shown and described is very simple and durable in construction, and permits the operator to quickly and powerfully brake the wheel or drum A and the parts connected therewith, and the brake mechanism can be readily thrown off whenever it is desired to do so.

Having thus described my invention, I claim as new and desire to secure by Letters Patent:

1. A brake mechanism comprising a brake wheel, a brake band, a fixed support on which the middle portion of the brake band is secured to form two independently flexing side arms for braking engagement with the inner face of the rim of said brake wheel, a fabric covering on the brake band, and a clamping bolt for clamping the cover to the face of the said band, said band having a recess for the reception of the covering material under the head of said bolt.

2. A brake mechanism having a brake wheel, a brake band for engagement with the rim of the brake wheel and having fabric covering, and a clamping bolt for clamping the covering to the face of the said band, the latter having a recess for the reception of the covering material under the head of the said bolt.

In testimony whereof I have signed my name to this specification in the presence of two subscribing witnesses.

WILLIAM HENRY DOUGLAS.

Witnesses:
 THEO. G. HOSTER,
 EVERARD B. MARSHALL.